United States Patent
Mishra et al.

(10) Patent No.: US 12,376,016 B2
(45) Date of Patent: Jul. 29, 2025

(54) MACHINE LEARNING DYNAMIC RADIO SIGNAL STRENGTH INDICATOR (RSSI) THRESHOLD FOR MANAGING CONNECTIONS WITH WI-FI 6E CLIENTS

(71) Applicant: Fortinet, Inc., Sunnyvale, CA (US)

(72) Inventors: Ruchir Mishra, Sunnyvale, CA (US); Shrikant Gambheer Patil, Sunnyvale, CA (US); Karthik Vasudevan, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 401 days.

(21) Appl. No.: 18/088,980

(22) Filed: Dec. 27, 2022

(65) Prior Publication Data

US 2024/0214913 A1    Jun. 27, 2024

(51) Int. Cl.
| | |
|---|---|
| *H04W 4/00* | (2018.01) |
| *H04B 17/318* | (2015.01) |
| *H04W 12/06* | (2021.01) |
| *H04W 48/16* | (2009.01) |
| *H04W 84/12* | (2009.01) |

(52) U.S. Cl.
CPC .......... *H04W 48/16* (2013.01); *H04B 17/318* (2015.01); *H04W 12/06* (2013.01); *H04W 84/12* (2013.01)

(58) Field of Classification Search
CPC ..... H04W 48/16; H04W 12/06; H04B 17/318
USPC ......................................................... 370/328
See application file for complete search history.

(56) References Cited

U.S. PATENT DOCUMENTS

| | | | |
|---|---|---|---|
| 2015/0257026 A1* | 9/2015 | Muttik ............. | H04W 28/0226 370/252 |
| 2022/0030665 A1 | 1/2022 | Nakanishi et al. | |

* cited by examiner

*Primary Examiner* — Temica M Beamer
(74) *Attorney, Agent, or Firm* — Law Office of Dorian Cartwright; Dorian Cartwright

(57) ABSTRACT

A dynamic radio signal strength indicator (RSSI) connection threshold is determined, with machine learning, based on previous Wi-Fi 6E connection data for the Wi-Fi 6E access point. An authentication request frame (or other type of frame) is received from a Wi-Fi 6E client that received a beacon. The authentication request or other management frame includes an RSSI measurement characterizing signal strength between the Wi-Fi 6E client and the Wi-Fi 6E access point. It is determining whether the RSSI measurement of the authentication request frame satisfies the machine learning RSSI threshold as a minimum signal strength for connections. Responsive to the RSSI measurement not satisfying the RSSI threshold, the connection with the Wi-Fi 6E client is refused.

7 Claims, 5 Drawing Sheets

MACHINE LEARNING DYNAMIC RADIO SIGNAL STRENGTH INDICATOR (RSSI) THRESHOLD FOR MANAGING CONNECTIONS WITH WI-FI 6E CLIENTS

FIELD OF THE INVENTION

The invention relates generally to computer networks, and more specifically, to wirelessly managing connections with Wi-Fi 6E clients, for access to a backbone network, based on a machine learning dynamic radio signal strength indicator (RSSI) threshold to prevent far away connections.

BACKGROUND

In convention Wi-Fi deployments, access points use probe request and probe response frames to prevent poor connections from certain stations that are far away. Because stations share a common resource in the access point, a poor performing station takes longer to complete transactions, and slow down subsequent transactions. For instance, Wi-Fi 6E operates on relatively short wavelengths and loses performance when stations are far away.

In response, access points discriminate between stations at connection by rejecting those below a certain RSSI value. Those weak connections can retry later under better conditions or can join a different access point. In the absence of a functional Probe-Response-Threshold feature, a 6 GHz client, e.g., far away from this deployment or in areas of poor coverage tries to connect to 6 GHz radio (of nearest access point), will get connected at a poor RSSI. The RSSI is a measurement of power level being received after transmission of a data packet. The higher the RSSI value, the stronger the signal. Since the connection is weak, 6 GHZ AP has to transmit and will receive frames at lower-data-rates to the respective station (as mandated by the rate-adaptation algorithm).

Problematically, Wi-Fi 6E removes unicast probe requests and probe responses, introducing the concept of unsolicited broadcast probes. This feature has no value or importance left, because now these unsolicited broadcast probes cannot prevent a far-away-client connection.

What is needed is a robust technique for wirelessly managing connections with Wi-Fi 6E clients, for access to a backbone network, based on a machine learning dynamic RSSI threshold, to prevent far away connections.

SUMMARY

To meet the above-described needs, methods, computer program products, and systems for wirelessly managing connections with Wi-Fi 6E clients, for access to a backbone network, based on a machine learning dynamic RSSI threshold.

In one embodiment, a dynamic RSSI connection threshold is determined, with machine learning, based on previous Wi-Fi 6E connection data for the Wi-Fi 6E access point. Additional factors can include, without limitation, current number of connections, and an average RSSI measurement for current connections.

In another embodiment beacon frames are broadcasting advertising capabilities of the Wi-Fi 6E access point. An authentication request frame (or other types of management frames besides probe request or probe response frames) is received from a Wi-Fi 6E client that received a beacon. The authentication request includes an RSSI measurement characterizing signal strength between the Wi-Fi 6E client and the Wi-Fi 6E access point. It is determining whether the RSSI measurement of the authentication request frame satisfies the machine learning RSSI threshold as a minimum signal strength for connections. Responsive to the RSSI measurement not satisfying the RSSI threshold, the connection with the Wi-Fi 6E client is refused.

Advantageously, network performance and computer performance are improved with more responsive access points.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for wirelessly managing connections with Wi-Fi 6E clients, for access to a backbone network, based on a machine learning dynamic RSSI threshold. One of ordinary skill in the art will recognize many alternative embodiments that are not explicitly listed based on the following disclosure.

I. Systems for Machine Leaning Dynamic RSSI Connection Threshold (FIGS. 1-2)

Figure 1:
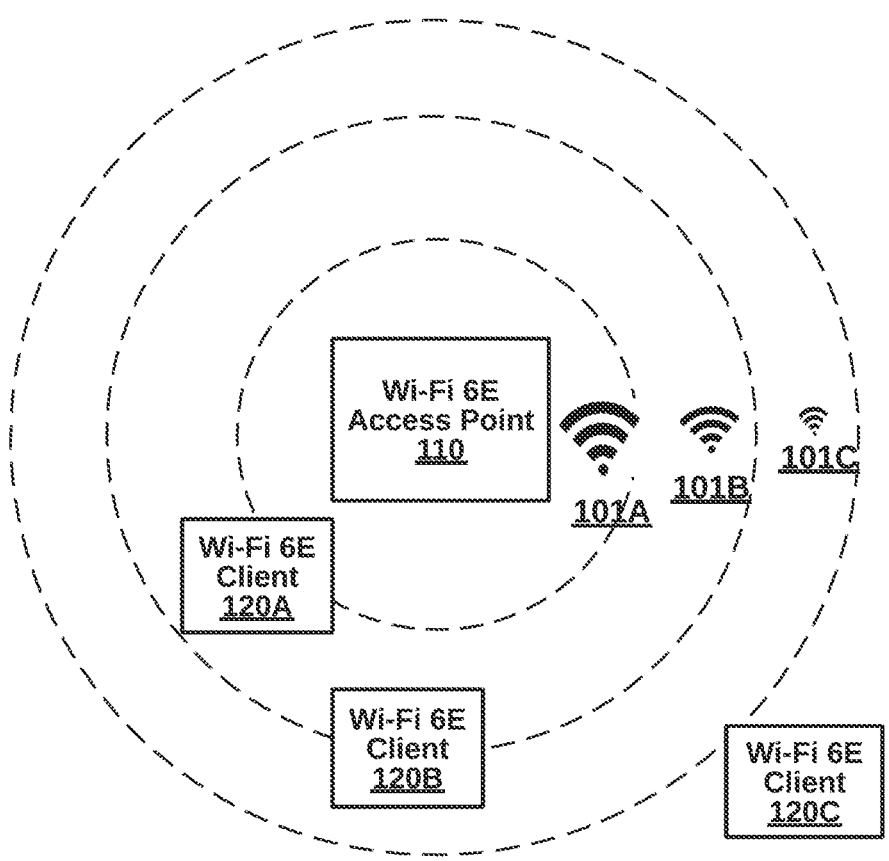
FIG. 1 is a high-level block diagram illustrating a system for wirelessly managing connections with Wi-Fi 6E clients, for access to a backbone network, based on a machine learning dynamic RSSI threshold, according to one embodiment.
Figure 2:
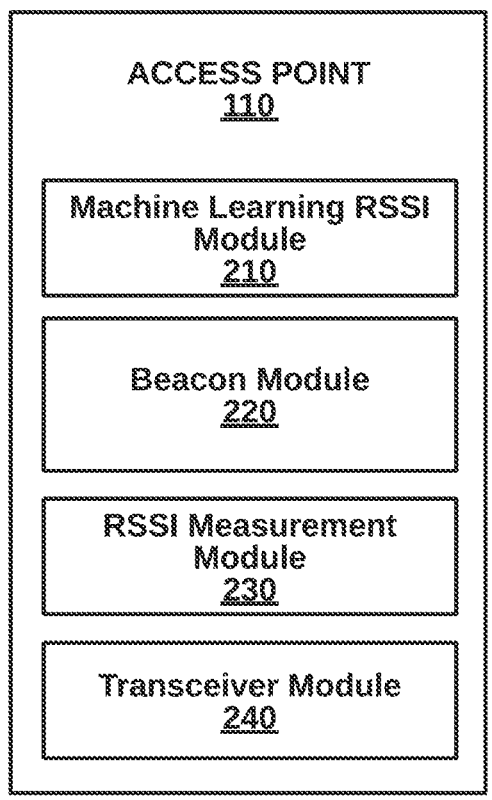
FIG. 2 is a more detailed block diagram illustrating an access point of the system of FIG. 1, according to one embodiment.

FIG. 1 is a high-level block diagram illustrating a system 100 for wirelessly managing connections with Wi-Fi 6E clients, for access to a backbone network, based on a machine learning dynamic RSSI threshold, according to one embodiment. The system 100 includes a Wi-Fi 6E access point 110 and Wi-Fi 6E clients 120A-C. Other embodiments of the system 100 can include additional components that are not shown in FIG. 1, such as controllers, network gateways, firewalls, and additional access points and non-Wi-Fi 6E stations.

In one embodiment, the components of the automatic system 100 are coupled in communication over a private network connected to a public network, such as the Internet. In another embodiment, system 100 is an isolated, private network. The components can be connected to the data communication system via hard wire (e.g., Wi-Fi 6E access point 110). The components can also be connected via wireless networking (e.g., clients 120A-C). The data communication network an be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPV4 or IPV6 address spaces.

The Wi-Fi 6E access point 110 allows connections from Wi-Fi 6E clients 120A-C based on meeting a dynamic RSSI connection threshold. The power indicator 101A closest to transceivers is the highest, while power indicator 101C farthest from the transceivers is lowest, with power indicator 101B in between. The power indicators illustrate waning RSSI strength over distance. The Wi-Fi 6E client 120C is farthest away from the Wi-Fi 6E access point, and thus, likely has the weakest RSSI signal. At a certain point, the distance affects performance to other clients.

Machine learning or artificial intelligence, in some embodiments, is used to determine the dynamic RSSI connection threshold. RSSI is a power level of received authentication request frames or other types of frames, measured over the preamble portion of the frame. Received channel power indicator (RCPI) is a power indicator used in some other embodiments.

The Wi-Fi 6E access point 110 can be a self-contained hardware box, a virtual access point, or the like. Wireless transmissions can be at 2.4 GHz, 5 GHz or 6 GHz, for example. The Wi-Fi 6E access point is described further below with respect to FIG. 2.

The Wi-Fi 6E clients 120A-C can be capable of Wi-Fi 6E communications as well as legacy communications such as Wi-Fi 6 and Wi-Fi 5. Stations respond to beacons sent out by access points advertising services. Once authenticated and associated, data packets can be wirelessly exchanged within the network.

Some embodiments include a Wi-Fi controller to centrally manage a group of access points. In this case, when clients roam from one access point to another access point under the same Wi-Fi controller, historical information can be quickly retrieved for applying uniform policies during roaming. Furthermore, the Wi-Fi controller can help determine the RSSI connection threshold by providing data from other access points.

FIG. 2 is a more detailed block diagram illustrating the access point 120 of the system of FIG. 1, according to one embodiment. The access point 110 includes a machine learning RSSI module 210, a beacon module 220, an RSSI measurement module 230, and a transceiver module 240. The components can be implemented in hardware, software, or a combination of both.

The machine learning RSSI module 210 can determine a dynamic RSSI connection threshold, with machine learning, based on previous Wi-Fi 6E connection data for the Wi-Fi 6E access point, a current number of connections, and an average RSSI measurement for current connections. For example, a long-haul wireless connection does not affect an access point under moderate loads, but as loads increase to affect the access point, threshold values can be increased. Learning can be supervised or unsupervised and based on neural networks. Historical connection data collected over time can provide an initial baseline for where to set threshold values. Actual connection data at a specific access point can update data.

The beacon module 220, in an embodiment, broadcasts beacon frames advertising capabilities of the Wi-Fi 6E access point. The beacon frames indicate a BSSID/SSID and services offered by access points. Clients can receive beacons from access points within RF range and select which access point for initiating a connection via authentication and association protocols.

The RSSI measurement module 230 receives an authentication request frame from a Wi-Fi 6E client that received a beacon broadcast. The authentication request includes a RSSI measurement characterizing signal strength between the Wi-Fi 6E client and the Wi-Fi 6E access point. The RSSI measurement module 230 can determine whether the RSSI measurement of the authentication request frame satisfies the machine learning RSSI threshold as a minimum signal strength for connections. Responsive to the RSSI measurement not satisfying the RSSI threshold, the connection with the Wi-Fi 6E client is refused.

The transceiver module 240 includes analog and digital circuitry for sending and receiving RF signals over an antenna. Data packets represented as bits are wirelessly transmitted according to IEEE 802.11 6E and other protocols. RSSI measurements can be conducted by the transceiver module 240, and output to a memory location known by the RSSI measurement module 230, in one implementation.

II. Methods for Machine Leaning Dynamic RSSI Connection Threshold (FIGS. 3-4)

Figure 3:
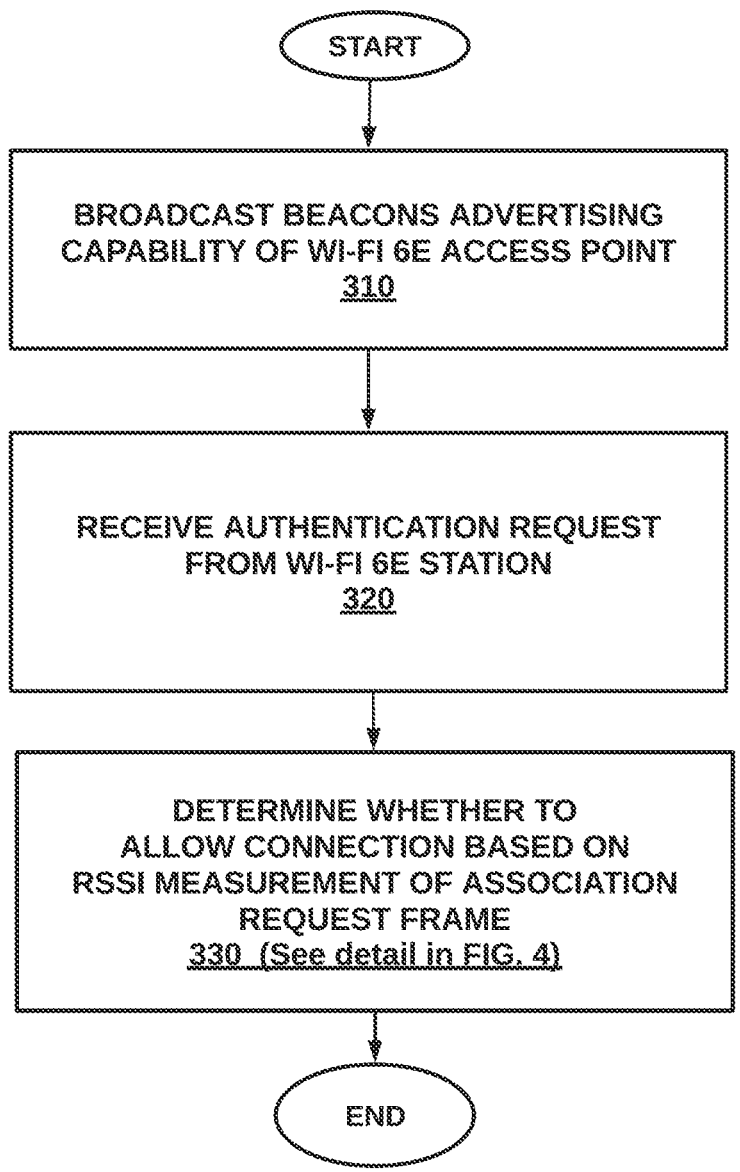
FIG. 3 is a high-level flow diagram illustrating a method for wirelessly managing connections with Wi-Fi 6E clients, for access to a backbone network, based on a machine learning dynamic RSSI threshold, according to one embodiment.

FIG. 3 is a high-level flow diagram illustrating a method 300 for wirelessly managing connections with Wi-Fi 6E clients, for access to a backbone network, based on a machine learning dynamic RSSI threshold, according to one embodiment. The method 300 can be implemented by, for example, system 100 of FIG. 1.

At step 310, beacons are broadcast advertising capabilities of the Wi-Fi 6E access point. A step 320, an authentication request frame is received from a Wi-Fi 6E client that received a beacon. The authentication request includes a radio signal strength indicator (RSSI) measurement characterizing signal strength between the Wi-Fi 6E client and the Wi-Fi 6E access point.

Figure 4:
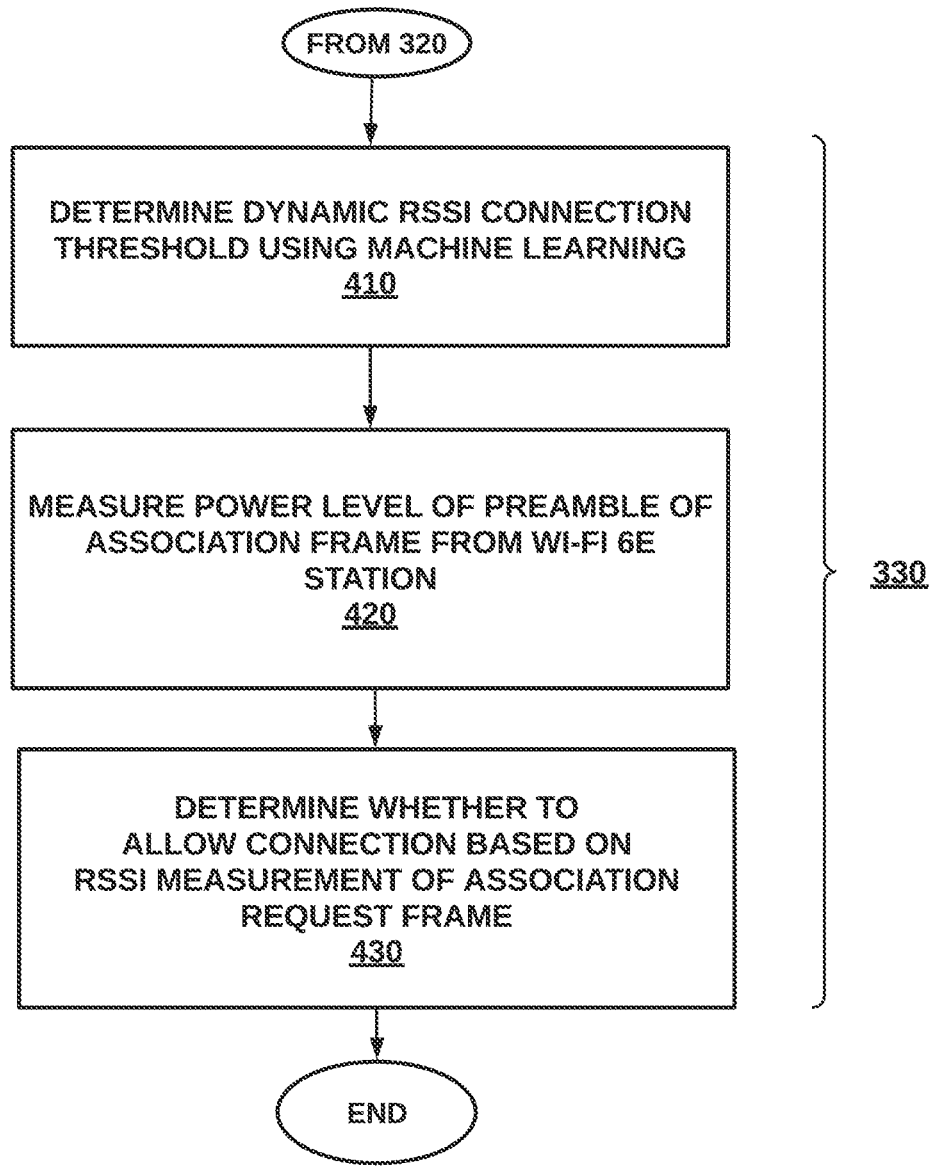
FIG. 4 is a more detailed flow diagram illustrating a step for determining whether to accept a connection based on RSSI measurements of authentication request, from the method of FIG. 3, according to an embodiment.

At step 330, it is determined whether the RSSI measurement of the authentication request frame satisfies the machine learning RSSI threshold as a minimum signal strength for connections, as detailed further in FIG. 4.

Specifically, at step 410, a dynamic RSSI connection threshold is determined, with machine learning, based on previous Wi-Fi 6E connection data for the Wi-Fi 6E access point, a current number of connections, and an average RSSI measurement for current connections. At step 420, a power level of a preamble of an authentication request fame is measured. At step 430, responsive to the RSSI measurement not satisfying the RSSI threshold, the connection with the Wi-Fi 6E client is refused. Alternatively, if the RSSI measurement satisfies the RSSI threshold, the connection may be granted.

III. Computing Device for Machine Learning Dynamic RSSI Connection Threshold (FIG. 5)

Figure 5:
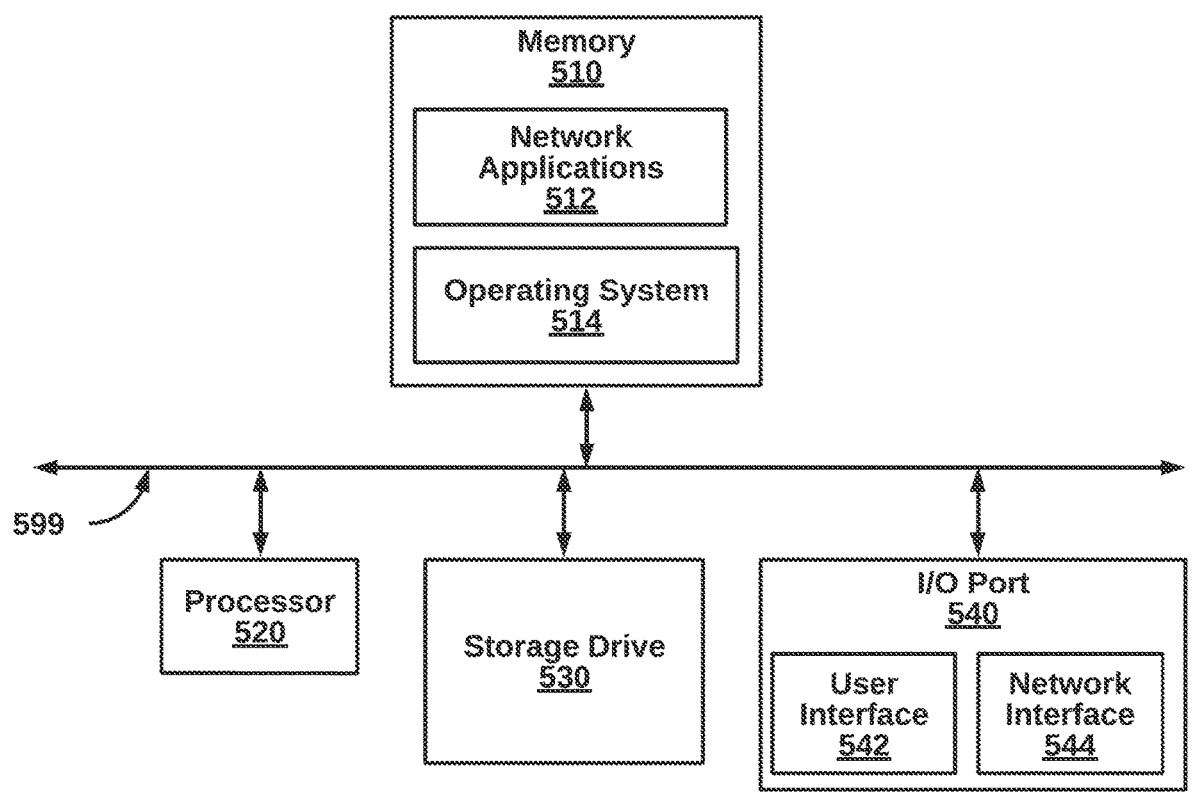
FIG. 5 is a block diagram illustrating an example computing device for the system of FIG. 1, according to one embodiment.

FIG. 5 is a block diagram illustrating a computing device 500 for use in the system 100 of FIG. 1, according to one embodiment. The computing device 500 is a non-limiting example device for implementing each of the components of the system 100, including an EPCS server 105, access point 110, and clients 120A-C and 122. Additionally, the computing device 500 is merely an example implementation itself, since the system 100 can also be fully or partially implemented with laptop computers, tablet computers, smart cell phones, Internet access applications, and the like.

The computing device 500, of the present embodiment, includes a memory 510, a processor 520, a hard drive 530, and an I/O port 540. Each of the components is coupled for electronic communication via a bus 550. Communication can be digital and/or analog, and use any suitable protocol.

The memory 510 further comprises network access applications 512 and an operating system 514. Network access applications can include 512 a web browser, a mobile access application, an access application that uses networking, a remote access application executing locally, a network protocol access application, a network management access application, a network routing access applications, or the like.

The operating system 514 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 520 can be a network processor (e.g., optimized for IEEE 802.11), a general purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the hard drive 530.

The storage device 530 can be any non-volatile type of storage such as a magnetic disc, EEPROM, Flash, or the like. The storage device 530 stores code and data for access applications.

The I/O port 540 further comprises a user interface 542 and a network interface 544. The user interface 542 can output to a display device and receive input from, for example, a keyboard. The network interface 544 connects to a medium such as Ethernet or Wi-Fi for data input and output. In one embodiment, the network interface 544 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A method in a Wi-Fi 6E access point on a wireless local access network (WLAN), at least partially implemented in hardware, for wirelessly managing connections with Wi-Fi 6E clients, for access to a backbone network, based on a machine learning for dynamic radio signal strength indicator (RSSI) connection thresholds, the method comprising:

automatically determining a dynamic RSSI connection threshold, with machine learning, based on previous Wi-Fi 6E connection data for the Wi-Fi 6E access point, a current number of connections, and an average RSSI measurement for current connections;

broadcasting beacons advertising capabilities of the Wi-Fi 6E access point;

receiving an authentication request frame from a Wi-Fi 6E client that received a beacon, wherein the authentication request includes an RSSI measurement characterizing signal strength between the Wi-Fi 6E client and the Wi-Fi 6E access point;

determining whether the RSSI measurement of the authentication request frame satisfies the machine learning RSSI threshold as a minimum signal strength for connections; and responsive to the RSSI measurement not satisfying the RSSI threshold, refusing the connection with the Wi-Fi 6E client.

2. The method of claim 1, further comprising:
detecting network performance,
wherein the automatically determining step determines the RSSI connection threshold based at least partially on the network performance.

3. The method of claim 1, further comprising:
transmitting a connection refusal code to the Wi-Fi 6E client.

4. The method of claim 1, further comprising:
responsive to the RSSI measurement satisfying the RSSI connection threshold, allowing the connection with the Wi-Fi 6E client.

5. The method of claim 1, further comprising:
receiving data from a Wi-Fi controller that manages a plurality of access points, wherein the plurality of access points automatically determine dynamic RSSI connection thresholds.

6. A non-transitory computer-readable medium in a Wi-Fi 6E access point on a wireless local access network (WLAN), at least partially implemented in hardware, storing instructions that, when executed by a processor, perform a computer-implemented method for access to a backbone network, based on a machine learning for dynamic radio signal strength indicator (RSSI) connection thresholds, the method comprising:

automatically determining a dynamic RSSI connection threshold, with machine learning, based on previous Wi-Fi 6E connection data for the Wi-Fi 6E access point, a current number of connections, and an average RSSI measurement for current connections;

broadcasting beacons advertising capabilities of the Wi-Fi 6E access point;

receiving an authentication request frame from a Wi-Fi 6E client that received a beacon, wherein the authentication request includes an RSSI measurement characterizing signal strength between the Wi-Fi 6E client and the Wi-Fi 6E access point;

determining whether the RSSI measurement of the authentication request frame satisfies the machine learning RSSI threshold as a minimum signal strength for connections; and responsive to the RSSI measurement not satisfying the RSSI threshold, refusing the connection with the Wi-Fi 6E client.

7. A Wi-Fi 6E access point on a wireless local access network (WLAN), at least partially implemented in hardware, for wirelessly managing connections with Wi-Fi 6E clients to a backbone network, based on a machine learning for dynamic radio signal strength indicator (RSSI) connection thresholds, Wi-Fi 6E access point comprising:

a processor;

a network interface communicatively coupled to the processor and to the WLAN; and a memory, communicatively coupled to the processor and storing:

machine learning RSSI module to automatically determine a dynamic RSSI connection threshold, with machine learning, based on previous Wi-Fi 6E connection data for the Wi-Fi 6E access point, a current number of connections, and an average RSSI measurement for current connections;

a beacon module to broadcast beacons advertising capabilities of the Wi-Fi 6E access point; and an RSSI module to receive an authentication request frame from a Wi-Fi 6E client that received a beacon, wherein the authentication request includes an RSSI measurement characterizing signal strength between the Wi-Fi 6E client and the Wi-Fi 6E access point, wherein the RSSI module determines whether the RSSI measurement of the authentication request frame satisfies the machine learning RSSI threshold as a minimum signal strength for connections, and responsive to the RSSI measurement not satisfying the RSSI threshold, refusing the connection with the Wi-Fi 6E client.

\* \* \* \* \*